3,142,572
COFFEE PRODUCT
John M. Miller, Mountainside, and Edward J. O'Connell, Elizabeth, N.J., assignors to Tenco, a Division of The Coca-Cola Company, Linden, N.J., a corporation of Delaware
No Drawing. Filed Nov. 9, 1961, Ser. No. 151,203
5 Claims. (Cl. 99—71)

The present invention relates to concentrated coffee extracts and more particularly to dried powdered extracts of the character commercially known as instant coffees.

The primary object of the present invention is to produce an improved concentrated coffee extract which, when diluted to beverage strength with hot water, exhibits a substantially lessened tendency to foam without having added thereto foam suppressing substances which are foreign to the usual coffee brew.

A related object is to enhance the appearance, and thus the consumer acceptance, of a hot freshly prepared cup of instant coffee by reducing the foam which heretofore has resulted when hot water is poured on the coffee powder without affecting the taste, aroma or appearance of the coffee.

One of the problems which has confronted the instant coffee manufacturer is the production of an instant coffee product which has an acceptable appearance when diluted to beverage strength with hot water. It is highly desirable from the standpoint of consumer acceptance that the hot freshly prepared cup of instant coffee should be as free as possible from foam. Instant coffees, which are produced by concentrating and drying a dilute coffee extract, exhibit a substantial tendency to produce a relatively stable surface foam when diluted to beverage strength with hot water. The foamy surface has generally been found to be displeasing to consumers, and also the creation of foam, when the instant coffee powder is diluted, creates substantial problems when the product is to be dispensed from a vending machine.

Various methods have been suggested for the elimination of foam in instant coffee powders in order to produce a foam-free instant coffee beverage. One of the most widely employed solutions involves the introduction of a silicone type anti-foaming agent, in combination with emulsifiers, into the coffee powder. These agents are usually introduced into the concentrated extract just prior to drying, and have been effective in combating foam on the surface of the beverage produced when hot water is added to the instant coffee powder. Another anti-foaming agent which has been tried involves a coffee oil derivative obtained by hydrolyzing coffee oil to produce a fatty acid which can be added to the instant coffee product. It will be appreciated, however, that the use of such anti-foaming agents involves adding materials to the coffee which are foreign to the coffee, that is, which do not occur naturally in the coffee bean. This is especially true in the case of silicone additives.

The present invention involves the discovery that a dry chaff extract, produced when chaff, which is winnowed from ground roasted coffee, is extracted as a dilute solution with hot water and the extract processed into a dry product, when added to instant coffee, is highly effective in preventing foaming when the instant coffee is diluted with hot water.

The chaff extract which is produced in accordance with our invention and added to instant coffee is derived from grinder chaff produced when whole roasted coffee beans are ground and the chaff is removed by a gentle stream of air. It is this partciular chaff which yields the desired extract. The chaff collected from the coffee roasting operation has been tried but has not yielded the desired extract. Nor has it been possible to obtain the desired extract from ground roasted coffee.

To produce a grinder chaff extract, the grinder chaff is removed during the grinding of whole roasted coffee beans and is combined with enough hot water to make a fairly thin slurry. This slurry usually contains about one part chaff to from ten to fifteen parts of water. The mixture is stirred for a short time at a temperature around 200° F., that is, at a temperature near the boiling point of water, and the suspended matter in the slurry is rapidly separated from the extract by filtration and washing. The bed of extracted chaff is washed with hot water to remove any entrained extract. The extract, which contains about 2% solids and represents about a 20% yield of soluble solids from the chaff, is then concentrated by evaporation to about 30% solids and spray dried.

When the dried extract is added to instant coffee in an amount of about 0.5% a substantial reduction in foam is noticed when the instant coffee product is diluted with hot water.

To illustrate more specifically the present invention, reference should be made to the following example:

Whole roasted coffee beans were ground in a regular commercial grinder, and the chaff was removed by drawing a gentle stream of air through the falling stream of grounds. Twenty-six pounds of collected chaff were mixed with 374 pounds of water in a steam-jacketed tank and maintained at 200° F. for three minutes. The slurry of chaff and water was then pumped into a vessel fitted with a screen at the top. Three hundred pounds of extract were removed by introducing hot water into the bottom of the vessel and withdrawing the extract from the top. An additional 374 pounds of extract was withdrawn in the same manner and placed into the slurry tank for the make-up of the next slurry.

The treatment of a total amount of 416 pounds of chaff resulted in the production of 79 pounds of soluble solids for a yield of 19%. The extract contained 1.64% solids concentration and, after centrifuging to remove sediment and fine particles of chaff, was concentrated in an agitated film evaporator to a concentrate containing 30% solids. This concentrate was dried in a spray dryer to produce the chaff extract powder.

One part of the dried chaff extract powder was blended with three parts of instant coffee powder to produce a chaff-rich premix. Two parts of the premix were then metered into 98 parts of instant coffee so that the final instant coffee product contained approximately one-half percent chaff extract.

In order to test the efficiency of the chaff extract anti-foam preparation, a simple standardized test was devised. In this test two grams of the coffee powder to be tested were measured into a standard five ounce cup. To this cup was added water which had been at a full boil for at least 5 minutes. The water was poured rapidly onto the coffee to a level within about one-sixteenth inch of the rim of the cup. Without stirring, the surface of the brew was observed after two minutes and judged according to the following criteria:

Excellent—No foam visible
Good—A few small bubbles around the rim of the cup
Fair—A ring of bubbles at the rim but not more than $\frac{1}{16}''$ in width
Poor—A ring of foam at the rim more than $\frac{1}{16}''$ in width but not greater than $\frac{1}{8}''$ in width
Very poor—Foam in excess of $\frac{1}{8}''$ at rim (surface area of cup covered with foam to be estimated).

The following table presents the results of tests in which an instant coffee having an addition of anti-foam chaff extract is compared to instant coffee to which no anti-foam agent had been added:

|   | Sample Without Anti-Foam Treatment | Sample With 0.5% Chaff Anti-Foam Added |
|---|---|---|
| 1 | Very poor (50% surface) | Fair. |
| 2 | Poor | Good. |
| 3 | Fair | Do. |
| 4 | Very poor (40% surface) | Fair. |
| 5 | Poor | Good. |
| 6 | Very poor (30% surface) | Do. |

It has generally been found that, while amounts of chaff extract of about ½% are highly effective, as little as 0.25% can be used with noticeable results. The upper limit of addition of chaff extract to instant coffee powder is determined essentially by the flavor of the coffee and economy of addition. The upper limit will be determined at least in part by wholesomeness, flavor, and aroma of the coffee. Amounts of chaff extract anti-foam agent in excess of 1% have been tried and found to be effective although the increase in foam reduction has not been sufficiently great to warrant the use of such larger amounts of an extract which is relatively expensive when compared to the cost of the instant coffee product.

Those skilled in the art will no doubt be able to devise other processes for the production of chaff extract in accordance with this invention by following the teachings given herein. It is the intention that such modifications, alternative methods, equivalents and uses of the product, fall within the spirit and scope of the invention as expressed by the appended claims.

We claim as our invention:

1. An extract of roasted coffee grinder chaff prepared by winnowing chaff from roasted, ground coffee, forming a slurry of said chaff with water at a temperature below boiling and around 200° F., agitating said slurry, separating the chaff extract from the chaff residue, concentrating the chaff extract by evaporation, and drying said concentrated chaff extract.

2. A dried coffee extract containing in admixture the extract of roasted coffee grinder chaff of claim 1 in an amount sufficient to substantially reduce foam when said coffee extract is diluted with water to brew strength.

3. A dried coffee extract containing in admixture the dried extract of roasted coffee grinder chaff of claim 1 in an amount of between about 0.25% and about 1% to substantially reduce foam when said coffee extract is diluted with water to brew strength.

4. The method of reducing foam when hot water is added to instant coffee to form a coffee brew, comprising admixing with instant coffee powder a dried extract of roasted coffee grinder chaff obtained by extracting said chaff with water having a temperature below boiling and not substantially below about 200° F. in an amount sufficient to substantially reduce foam when said instant coffee is diluted with hot water.

5. A dry mixture comprising a predominant amount of concentrated coffee extract and a minor amount of a concentrated extract of roasted coffee grinder chaff produced by extracting chaff winnowed from roasted ground coffee with water at a temperature below boiling and around 200° F. and thereafter concentrating and drying said chaff extract, said dry chaff extract concentrate being admixed with said concentrated coffee extract in an amount sufficient to substantially reduce the foaming tendency of dry coffee extract when the coffee extract is diluted with water to brew strength.

References Cited in the file of this patent

UNITED STATES PATENTS

| 1,367,725 | Trigg | Feb. 8, 1921 |
| 2,098,961 | Fronmuller | Nov. 16, 1937 |
| 2,783,149 | Epstein | Feb. 26, 1957 |
| 2,929,716 | Barch et al. | Mar. 22, 1960 |

FOREIGN PATENTS

| 2,667 | Great Britain | of 1872 |